No. 697,830. Patented Apr. 15, 1902.
E. FRANC.
APPARATUS FOR MEASURING AND DRAWING LIQUIDS.
(Application filed Aug. 26, 1901.)
(No Model.) 3 Sheets—Sheet 2.

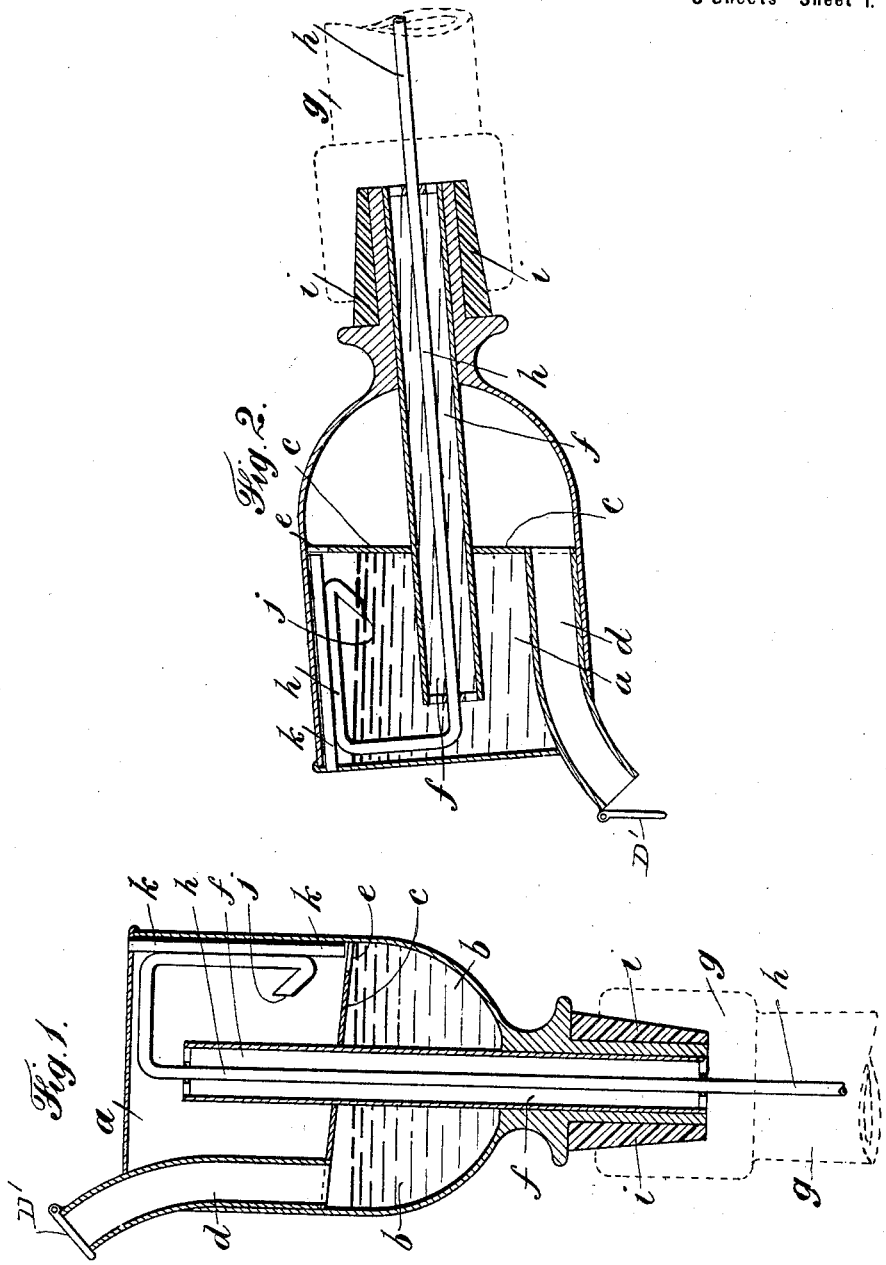

No. 697,830. Patented Apr. 15, 1902.
E. FRANC.
APPARATUS FOR MEASURING AND DRAWING LIQUIDS.
(Application filed Aug. 26, 1901.)
(No Model.) 3 Sheets—Sheet 3.

Witnesses:

Inventor
Emil Franc
By James L. Norris
Atty.

UNITED STATES PATENT OFFICE.

EMIL FRANC, OF LONDON, ENGLAND.

APPARATUS FOR MEASURING AND DRAWING LIQUIDS.

SPECIFICATION forming part of Letters Patent No. 697,830, dated April 15, 1902.

Application filed August 26, 1901. Serial No. 73,336. (No model.)

*To all whom it may concern:*

Be it known that I, EMIL FRANC, a subject of the King of Great Britain, residing at 62 Rosebery avenue, London, England, have invented certain new and useful Improvements in Construction of Apparatus for Measuring and Drawing Off Liquids from Bottles and the Like, of which the following is a specification.

The object of my invention is to construct an apparatus whereby liquids can be drawn off from bottles or the like on a tilting action of said vessel or the apparatus, the measured quantity being retained to be poured into a receptacle on the next tilting, so that the liquid flows from the bottle or vessel into the measuring-chamber at the same time the previously-measured liquor is being poured out of the apparatus into the receptacle.

My invention will be understood from the following description, aided by the accompanying drawings, in which—

Figure 3:
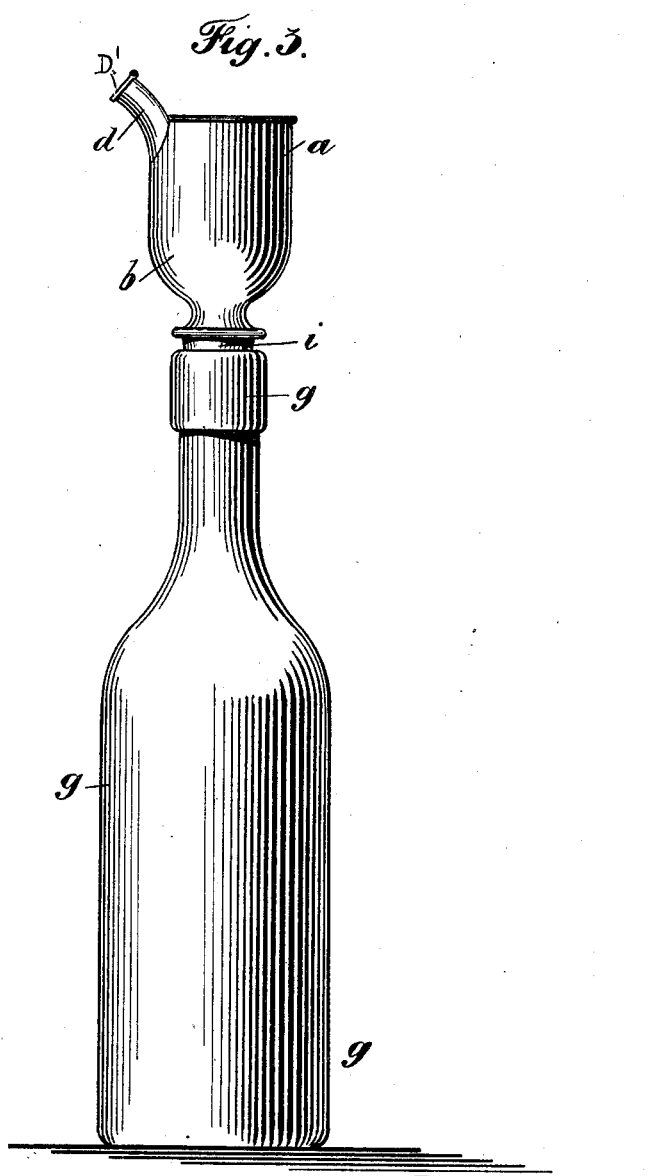
Figure 4:
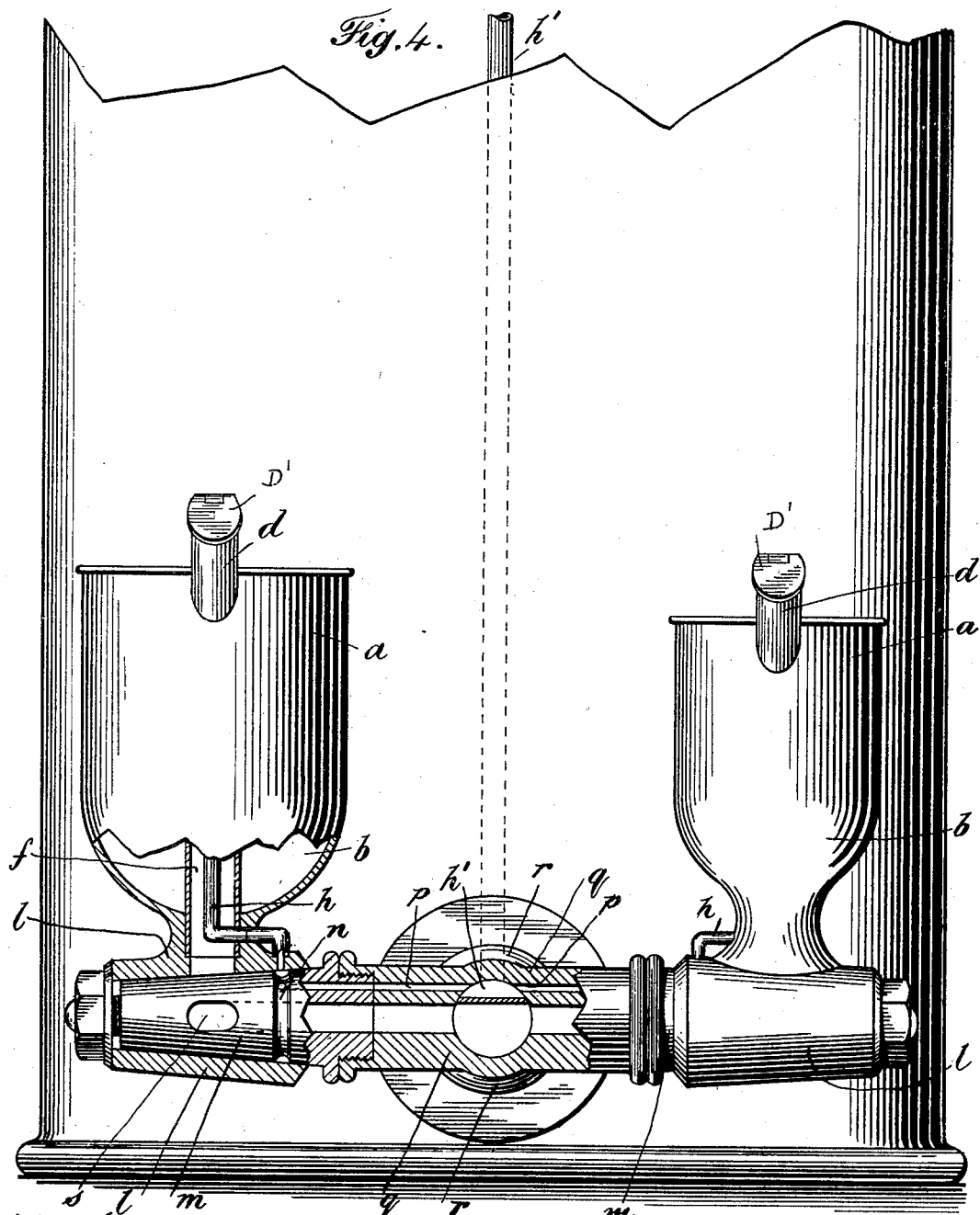

Figure 1 is a sectional elevation of my apparatus as applied to a bottle, (the bottle-neck being shown in dotted lines,) the apparatus being in the upright position with the lower compartment full of liquid. Fig. 2 is a similar view to Fig. 1, but in a tilted position, the lower vessel having been emptied and the upper vessel filled. Fig. 3 is an elevation of my apparatus and bottle complete. Fig. 4 is an elevation of a portion of an urn, showing the application of two measuring apparatus for different qualities of liquids, one apparatus being shown partly in section.

For the purpose of my invention I construct an apparatus or appliance with two compartments A B, the division-wall C being in a slanting or angled position, so that all the liquor contained in either compartment is emptied at each operation of the appliance. The upper end of the angled division-wall C is in connection with a pipe D, forming the outlet, and having a hinged lid D', and the lower end is provided with a hole E for passage of liquid from one chamber A to the other, B. A tube F is provided connecting the upper chamber A with the bottle G, and an air-pipe H is also supplied, this being so arranged and bent, as shown, that when the upper or measuring vessel is nearly full, as in Fig. 2, the air-supply to liquid-container is cut off by reason of the liquid reaching the tube H, and consequently the chamber A will not be filled any further. The whole apparatus is provided with a ring or cork I for attachment to the mouth of a bottle G or the like.

In action on the bottle G being tilted the liquor will enter the supply-pipe F and commence filling the upper chamber A until it reaches the inlet J of the air-pipe H, when it will close the air-supply, and consequently cut off the liquor-supply. On the bottle G being stood upright all the liquor will run out through the hole E in the angled partition C into the lower compartment B and fill same. On the next tilting of the bottle G all the liquor in the lower compartment B will pass through the tube D and be emptied into a glass or other vessel and the upper compartment A will be filled, as in the previous tilting. K is a vent-pipe fitted in the upper chamber A for assisting the passage of the liquor from the bottom chamber and supplying air to the whole apparatus.

When the appliance or apparatus is applied to urns and other immovable vessels, the part L is made in the form of a plug-socket to fit over a plug M, so as to be movable thereon, the air-pipe H being arranged in the part L in such manner that it has communication with a groove N in the plug-stem, this groove being in connection with a hole P, drilled in the T-pipe Q, attached to plug R of the urn and communicating with the air-pipe H', fitted inside the urn; but in some cases this pipe H' can be dispensed with. By this construction all that is necessary to be done is to tilt the apparatus until the tube F coincides with the plug-opening S for entrance of liquor from the urn to the upper chamber and at the same time emptying the lower chamber into a receptacle in the same manner as set forth with regard to Figs. 1 to 3.

In Fig. 4 I have shown two appliances to one urn and those of a different size, so that two different quantities of liquor can be served from one urn.

By this invention an equal quantity of liquor is served at each tilting of the apparatus, so that the proprietor of the vessel has a perfect check upon the sales, and this can be further assured by the addition of suitable counting mechanism to the apparatus.

Having now particularly described and ascertained the nature of my said invention and in what manner the same is to be performed, I declare that what I claim is—

1. In a device of the class described, a vessel having primary and secondary compartments in communication, a conduit communicating with the primary compartment and arranged to communicate with a suitable receptacle, a second conduit, connected with the secondary compartment, and a tube having an end in the primary compartment, and the other end arranged to be connected with said receptacle, and the primary compartment having air-venting means.

2. In a device of the class described, a vessel having communicating primary and secondary compartments, a conduit communicating with the primary compartment and arranged to communicate with a suitable receptacle, a second conduit, communicating with the secondary compartment, and a tube passing through the first conduit and having one end in the primary compartment, said tube being also arranged to communicate with said vessel, and said primary compartment having air-venting means.

3. In a device of the class described, a vessel, an inclined partition dividing said vessel into a plurality of superposed communicating compartments the upper compartment having an air-vent, a conduit connected with the lower compartment, a second conduit connected with the upper compartment, and a venting-tube having an end in the upper compartment, the opposite end of said tube and the lower end of the second conduit being arranged for communication with a suitable receptacle.

In testimony whereof I have hereunto set my hand in presence of two subscribing witnesses.

EMIL FRANC.

Witnesses:
 WM. O. BROWN,
 PERCY E. MATTOCKS.